No. 838,024. PATENTED DEC. 11, 1906.
A. C. HENDRICKS.
CLUTCH MECHANISM.
APPLICATION FILED MAY 7, 1906.
3 SHEETS—SHEET 2.
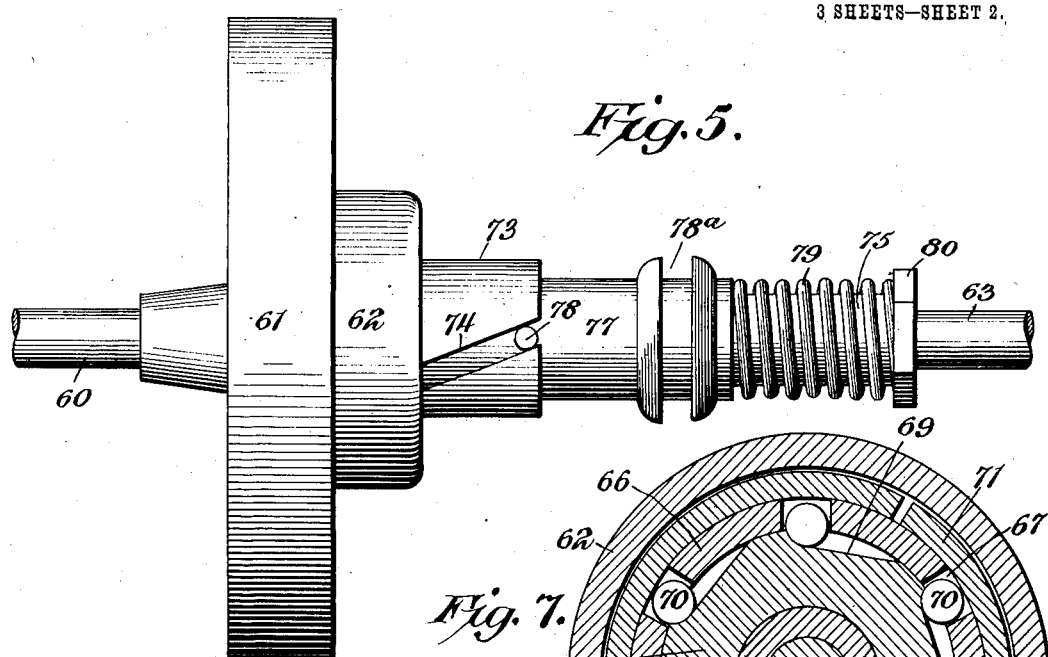
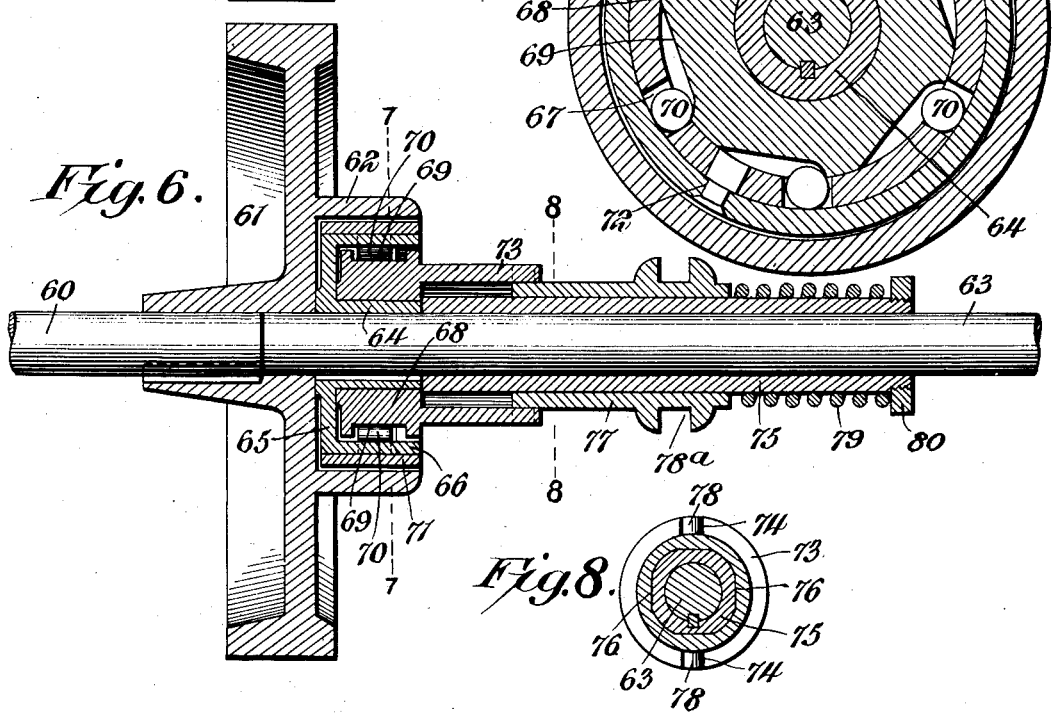
Adam C. Hendricks, Inventor,
Witnesses
Howard D. Orr
B. G. Foster
By E. G. Siggers
Attorney

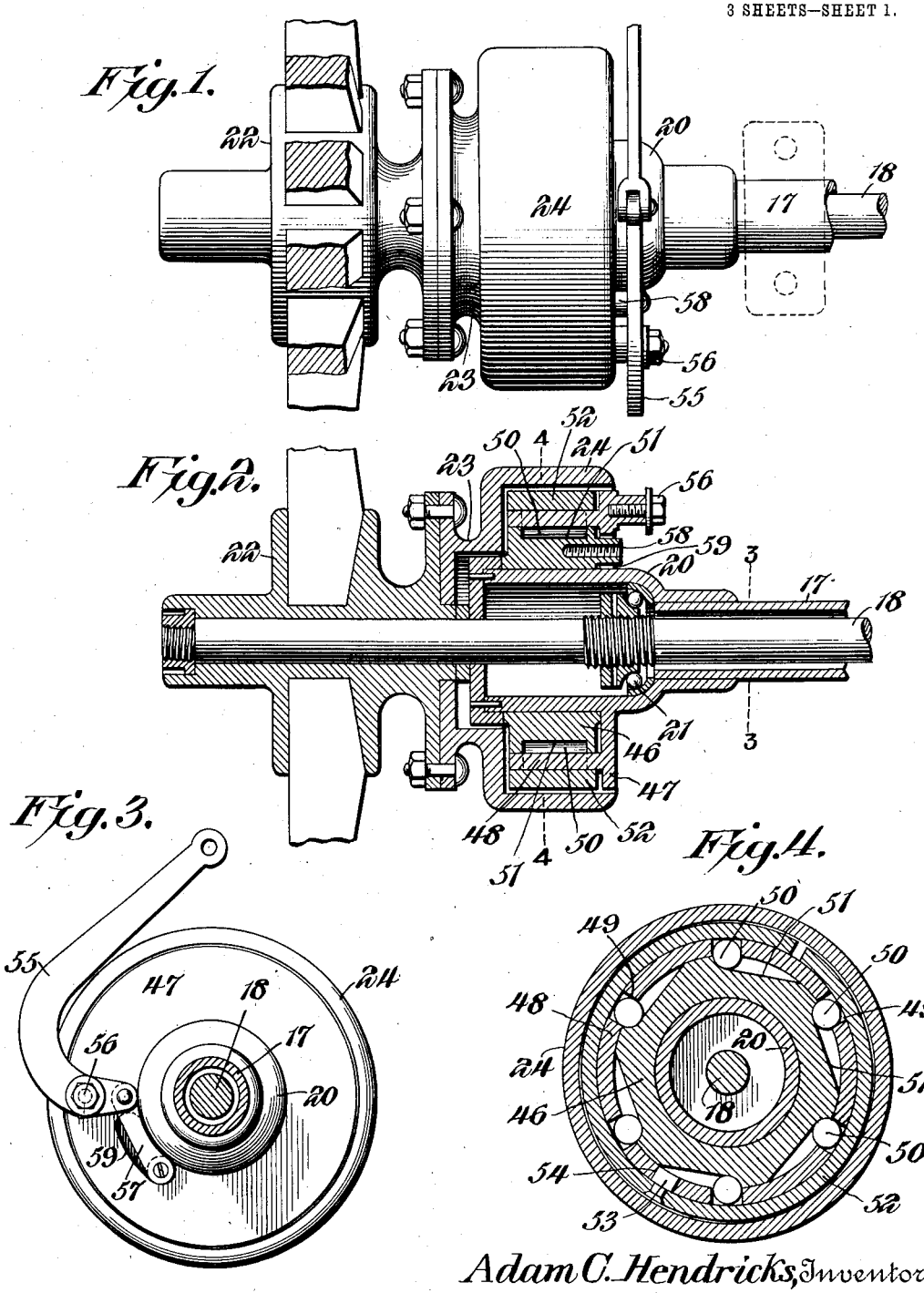

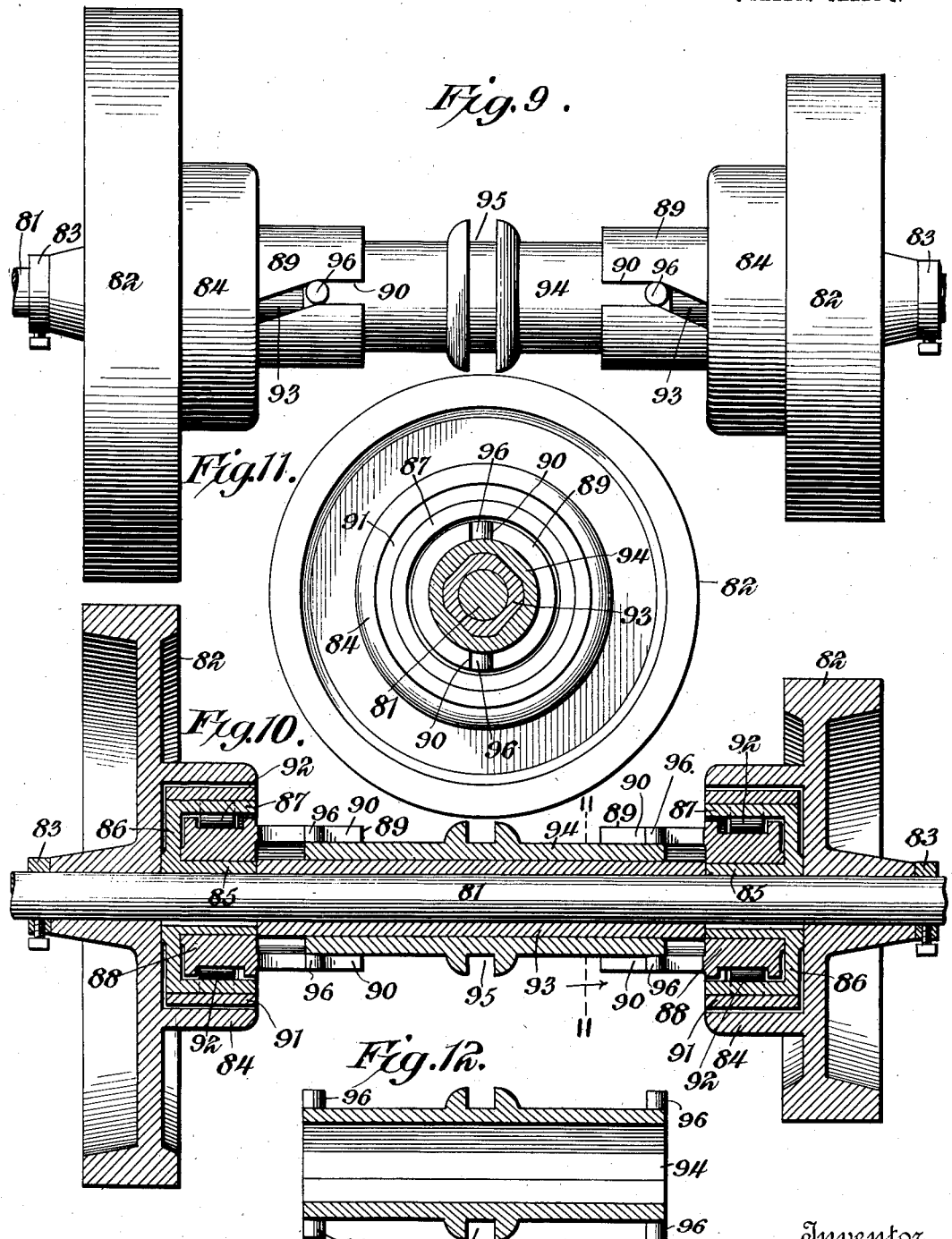

UNITED STATES PATENT OFFICE.

ADAM C. HENDRICKS, OF HAGERSTOWN, MARYLAND.

CLUTCH MECHANISM.

No. 838,024.

Specification of Letters Patent.

Patented Dec. 11, 1906.

Application filed May 7, 1906. Serial No. 315,587.

*To all whom it may concern:*

Be it known that I, ADAM C. HENDRICKS, a citizen of the United States, residing at Hagerstown, in the county of Washington and State of Maryland, have invented a new and useful Clutch Mechanism, of which the following is a specification.

This invention relates to means for clutching relatively rotating parts together against relative rotation, and it is applicable to a variety of structures—as, for instance, in coupling two rotating parts or as brake mechanism to stop the rotation of a part.

One of the principal objects is to provide novel mechanism of the above character which is very simple and inexpensive yet entirely efficient, being composed of parts not liable to become deranged and, furthermore, being so constructed that none of said parts is subjected to excessive strain or wear.

Another and important object is to provide novel brake mechanism whereby an even and powerful stopping action may be applied to a wheel or other rotating part, said mechanism being inclosed and occupying very little space.

Several embodiments of the invention are disclosed in the accompanying drawings, wherein—

Figure 1 is a top plan view of the improved mechanism when employed as a brake. Fig. 2 is a detail longitudinal sectional view through the same. Fig. 3 is a cross-sectional view on the line 3 3 of Fig. 2. Fig. 4 is a cross-sectional view on the line 4 4 of Fig. 2. Fig. 5 is a view in elevation of a modified form of structure, showing the clutch mechanism employed for connecting a driving or engine and transmission shafts. Fig. 6 is a longitudinal sectional view through the same. Fig. 7 is a cross-sectional view on the line 7 7 of Fig. 6. Fig. 8 is a cross-sectional view on the line 8 8 of Fig. 6. Fig. 9 is a view in elevation of another embodiment of the invention, showing the clutch mechanism arranged for reversing or differential speed gearing. Fig. 10 is a longitudinal sectional view therethrough. Fig. 11 is a cross-sectional view on the line 11 11 of Fig. 10. Fig. 12 is a detail longitudinal sectional view of the actuating-sleeve.

Similar reference-numerals designate corresponding parts in all the figures of the drawings.

In the embodiment illustrated in the first four figures a tubular casing 17 is employed, through which extends a rotatable driving member, shaft, or axle 18. The casing 17 has its outer end slightly enlarged, as shown at 20, and ball-bearings 21 for the shaft are preferably located therein, these bearings being of any suitable nature. A driven member or wheel 22 is mounted on the end of the shaft 18, and bolted or otherwise secured to the wheel is a sleeve 23, having an annular flange portion 24, surrounding and spaced from the enlarged portion 20 of the casing. For the purpose of braking or stopping the wheel 22 the following mechanism is preferably employed: The enlarged portion 20 of the casing constitutes a support that is stationary or non-rotatable with respect to the axle for a rotatable cam element 46, that is located within the enlarged portion 24 of the sleeve 23. The said enlarged portion 20 of the casing has an annular outstanding wall 47, that closes the inner end of the sleeve portion 24 and is provided with an inwardly-extending stationary guide element 48 in the form of a ring that surrounds the cam element 46 and has openings 49 therethrough. Rollers 50, located in the openings, have their inner sides operating against the cam-surfaces 51 of the cam element 46, while their outer sides are arranged to bear against a shoe in the form of a split clutch-ring 52, surrounding the guide 48 and secured thereto, as shown at 53. This securing means is preferably in the form of a lug riveted to the central portion of the shoe and having a detachable sliding engagement in an opening 54 in the ring. The shoe is interposed between the guide-ring 48 and the sleeve portion 24 and is arranged to be spread outwardly against the inner face of said sleeve portion by the clamping-rollers 50 when said clamping-rollers are moved outwardly upon the rotation of the cam element 46. This rotation is accomplished by means of a suitable lever 55, fulcrumed between its ends, as shown at 56, upon the wall 47 of the casing and having connected thereto a link 57, that is pivoted to a lug 58 on the cam element 46, which lug projects through a slot 59 in the wall 47. It will be seen that if the lever 55 is operated the cam element 46 will be partially revolved and the clamping-rollers will be moved outwardly, thereby spreading the shoe and causing it to be brought into binding relation with the surrounding portion of the sleeve. Thus the rotation of the sleeve and the wheel carrying it can be controlled by the operation of the lever. It will be apparent that this structure is exceedingly simple and will occupy but a comparatively small space. At the same time the clutching or braking action is powerful, and said action imparts no lateral strain to the parts, but is evenly distributed entirely around the shaft and casing.

Another embodiment of the invention is disclosed in Figs. 5-8, inclusive. This structure is more particularly intended for connecting a crank or engine shaft with a transmission-shaft, though not necessarily limited thereto. The crank or driving shaft is shown at 60 and has keyed or otherwise secured to it a fly-wheel 61, having on one side a sleeve or clutch member 62. The support or driven member is in the form of a shaft 63, having one end loosely journaled in the hub of the wheel 61, said shaft having a portion surrounded by the sleeve 62. Secured to the shaft 63 within the sleeve 62 is a hub 64, having an outstanding wall 65, provided with an annular guide element in the form of a ring 66, that is thus fixed to the shaft 63. The ring 66 is provided with openings 67 therethrough. Rotatably mounted on the hub 64 and located within the guide-ring 66 is a cam member 68, provided with cam-surfaces 69, arranged inside the openings 67. Rollers 70, operated by the cam-surfaces, are located in the openings 67 and are arranged to bear against a split shoe 71, surrounding the ring 66 and secured thereto, as shown at 72. The shoe is arranged to be moved into and out of engagement with the inner face of the sleeve 62 by the clamping-rollers 70 when said rollers are operated by the cam element. To secure these various movements, it therefore becomes necessary to effect the movement of the cam upon its support, and the following mechanism is preferably provided: The cam element has a collar 73 projecting outwardly beyond the guide-ring and having inclined slots 74 therein. A guide 75, suitably secured to the shaft 63, is provided with an angular outer face 76, on which is slidably mounted an actuating-sleeve 77. This sleeve has its inner end movable longitudinally within the collar 73 and provided with outstanding lugs 78, that engage in the slots 74. The sleeve 77, furthermore, has an annular groove 78ª to receive the ordinary yoke of a shifting-lever. A spring 79, surrounding the outer portion of the guide 75, has one end bearing against the sleeve 77 to move the same inwardly, its other end bearing against a nut 80, fixed to the guide. It will be apparent that as long as the clamping-rollers 70 are in line with the parts of the cam-surfaces 69 that are nearest the shaft 63 the shoe 67 will be out of binding engagement with the sleeve 62, and therefore the shaft 60 will rotate independently of the shaft 63. If, however, the actuating-sleeve 77 is moved inwardly, the lugs 78, riding in the inclined slots, will cause a partial rotation of the cam element, thereby moving the clamping-rollers outwardly and causing the shoe to be spread apart and to be brought into clutching engagement with the sleeve 62. The result is that the shaft 63 will be clutched to the shaft 60, and the two will rotate together.

An extension or modification of this latter embodiment is disclosed in Figs. 9-12, inclusive. This structure is clearly applicable for reversing or differential speed gearing. The supporting member in the present case is the driving member, and is in the form of a shaft 81, while the driven members are pulleys or gears 82, loosely journaled on the shaft 81 and spaced apart, their longitudinal outward movements upon the shaft being prohibited by suitable collars 83. These driven members are provided on their inner sides with clutch-sleeve portions 84, and keyed to the shaft within the sleeve portions 84 are hubs 85, having outstanding walls 86, provided with annular guide elements in the form of rings 87. Cam elements 88 are journaled on the hubs 85 within the rings 87 and have collars 89 provided with slots 90, having inclined portions. Clutch-shoes 91 are secured to the guide-rings 87 and are interposed between the same and the sleeve portions 84, being movable into and out of coaction with the same. Rollers 92, operated upon by the cam elements and located in the rings, effect the movement of the shoes. Arranged between the hubs 85 and suitably secured to the shaft 81 is a guide 93, having an angular outer face, and slidably mounted on this guide is an actuating-sleeve 94, having an intermediate annular groove 95 for the yoke of an ordinary controlling-lever. The opposite ends of the sleeve 94 are provided with outstanding lugs 96, which lugs respectively engage in the slots 90 of the cam-element collars 89. With this arrangement when the actuating-sleeve 94 is in its central position and the lugs 96 are at the outer ends of the inclined portions of the slots both the driven members will be unclutched and the shaft 81 can rotate independently thereof. If the actuating-sleeve 94 is moved in one direction, it will cause a partial rotation of one of the cam elements with respect to the shaft, thereby moving the rollers that coöperate with said cam element outwardly and causing the shoe to clutch the driven member. The other member will not be affected by this movement. If, however, a reverse movement takes place, the member above described will be unclutched by the retrograde movement of the cam element, while the latter member will be clutched to the shaft. Thus a simple reversing or differential speed gear is provided, and from the above it will be evident that the invention is capable of a wide range of application and usefulness.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In mechanism of the class described, the combination with support and clutch members relatively rotatable and located one within the other, of a cam mounted on one of the members and having a limited relative rotation with respect to the member on which it is mounted, a clamping element moved outwardly and inwardly by the cam on its said relative rotation, to clutch the support and clutch members against relative rotation, and means for effecting the said relative rotation of the cam.

2. In mechanism of the class described, the combination with a support, and a clutch member rotatable about the support, of a cam mounted on the support within the clutch member and relatively revoluble with respect to said support on which it is mounted, and a clamping element moved outwardly and inwardly by the cam on its said relative movement, to clutch and unclutch the support and rotatable clutch member.

3. In mechanism of the class described, the combination with a support, of a clutch member rotatable about the support, a cam mounted on the support within the clutch member and relatively revoluble with respect to said support on which it is mounted, said cam having a plurality of cam-surfaces, a plurality of clamping-rollers bearing against the cam-surfaces and moved outwardly by the cam on its said relative movement to clutch and unclutch the support and rotatable clutch member, and means for turning the cam member.

4. In mechanism of the class described, the combination with a support, of a rotatable member including a sleeve surrounding the support, a clutch-shoe located within the sleeve, said clutch-shoe being movable into and out of binding engagement with the sleeve and being held against relative rotation with respect to the support, a cam mounted on the support within the sleeve and capable of relative rotation on said support, a plurality of rollers interposed between the cam and shoe and moved outwardly to move the shoe upon the movement of said cam upon its support, and means for effecting the said relative movement of the cam.

5. In mechanism of the class described, the combination with support and clutch members relatively rotatable and located one within the other, of a cam mounted on one of the members and located between said members, said cam being rotatable with respect to the member on which it is mounted, a guide located between the cam and the other member, a loose clamping element located in the guide and moved by the cam to clutch the members upon said relative rotation of the cam, and means for effecting the relative rotation of the cam.

6. In mechanism of the class described, the combination with a support, of a clutch member having a portion surrounding the same, a cam mounted on the support within the clutch member and rotatable with respect to said support, means for moving the cam on its support, a guide device surrounding the clutch and fixed with respect to the support, and a loose clamping element located in the guide device and operated by the cam upon its said movement to clutch the support and member against free relative rotation.

7. In mechanism of the class described, the combination with a support, of a rotatable member including a sleeve surrounding a portion of the support, a ring interposed between the support and sleeve and fixed with relation to the former, said ring having openings therethrough, a cam mounted on the support within the ring and having a plurality of cam-surfaces arranged within the ring, rollers bearing against the cam-surfaces and located in the openings of the ring, said rollers being operated by the cam upon its movement to clutch the sleeve and the support, and means for moving the cam.

8. In mechanism of the class described, the combination with a support, of a rotatable member including a clutch-sleeve surrounding a portion of the support, a guide-ring fixed to the support and interposed between the same and the sleeve, said ring having openings, a split ring-shoe fixed to the guide-ring and embracing the same, said shoe being movable into and out of engagement with the clutch-sleeve, a cam rotatably mounted on the support inside the ring and having a plurality of cam-surfaces, rollers located in the openings of the guide-ring, said rollers bearing against the cam-surfaces and against the shoe, and means for rotating the cam.

9. In mechanism of the class described, the combination with a stationary support, of a member rotatable with respect to the support and having a clutch member, a cam rotatably mounted on the support, a guide fixed to the support and arranged adjacent to the cam, a clamping device mounted on the guide and operated by the cam upon its rotation to coact with the clutch member, and means for rotating the cam.

10. In mechanism of the class described, the combination with a stationary support, of a member rotatable with respect to the support and having a clutch member, a cam rotatably mounted on the support, a guide-ring fixed to the support and having openings, said ring being located between the cam and clutch member, a plurality of clamping-rollers mounted in the guide-openings and operated by the cam upon its rotation to resist the rotation of the clutch member, and means for rotating the cam.

11. In mechanism of the class described, the combination with a stationary support, of a member rotatable with respect to the support and having a clutch-sleeve, a cam rotatably mounted on the support, a guide-ring fixed to the support and located between the cam and sleeve, said guide-ring having a plurality of openings, a split shoe secured between its ends to the ring and being expansible against the clutch-sleeve, a plurality of clamping elements mounted in the openings of the ring, said elements being operated by the cam upon its rotation and effecting the expansion of the clutch-ring, and means for rotating the cam.

12. In mechanism of the class described, the combination with a stationary support, of an axle journaled therein and having a wheel, a clutch-sleeve carried by the wheel and surrounding a portion of the support, a cam journaled on the support within the sleeve, a wall secured to the support and closing the inner end of the sleeve, a guide-ring carried by the wall and having a plurality of openings, an expansible shoe mounted on the exterior of the ring and being expansible against the interior of the sleeve, a plurality of clamping-rollers located in the openings of the guide-ring and resting against the cam-surfaces, said rollers operating against the shoe, and means extending through the wall to operate the clutch-ring.

13. In mechanism of the class described, the combination with a support, of a rotatable member located adjacent thereto, a clutch-sleeve secured to the member and surrounding the support, a wall mounted on the support and closing the end of the sleeve that surrounds the same, clutch mechanism mounted within the sleeve and including a cam mounted on the support and actuating means for the clutch mechanism, said means including a lever fulcrumed on the wall and having a connection with the cam to rotate the same.

14. In mechanism of the class described, the combination with a stationary casing, of an axle rotatably mounted therein and projecting therefrom, a clutch-sleeve carried by the axle and surrounding a portion of the casing, a cam and a guide mounted on the casing within the sleeve and being relatively rotatable, a clamping element associated with the cam and guide and movable upon their relative rotation, and means for effecting the relative rotation of said cam and guide.

15. In mechanism of the class described, the combination with a stationary casing, of an axle journaled therein, a clutch-sleeve carried by the axle, and surrounding a portion of the casing, a guide fixed to the casing and arranged within the sleeve, a cam mounted on the casing within the guide, a clamping element associated with the cam and guide and movable upon the rotation of the cam, and means for rotating said cam upon the casing.

In testimony that I claim the foregoing as my own I have hereto affixed my signature in the presence of two witnesses.

ADAM C. HENDRICKS.

Witnesses:
JOHN H. SIGGERS,
BLANCHE J. KALDENBACK.